(12) United States Patent
Park et al.

(10) Patent No.: US 12,218,323 B2
(45) Date of Patent: Feb. 4, 2025

(54) METHOD FOR REUSING ACTIVE MATERIAL USING POSITIVE ELECTRODE SCRAP

(71) Applicant: LG ENERGY SOLUTION, LTD., Seoul (KR)

(72) Inventors: Se-Ho Park, Daejeon (KR); Min-Seo Kim, Daejeon (KR); Doo-Kyung Yang, Daejeon (KR); Myung-Hwan Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 26 days.

(21) Appl. No.: 17/788,705

(22) PCT Filed: Nov. 6, 2020

(86) PCT No.: PCT/KR2020/015556
§ 371 (c)(1),
(2) Date: Jun. 23, 2022

(87) PCT Pub. No.: WO2021/241819
PCT Pub. Date: Dec. 2, 2021

(65) Prior Publication Data
US 2023/0045467 A1 Feb. 9, 2023

(30) Foreign Application Priority Data

May 25, 2020 (KR) .................. 10-2020-0062372

(51) Int. Cl.
*H01M 10/54* (2006.01)
*C01G 51/00* (2006.01)
(Continued)

(52) U.S. Cl.
CPC ............ *H01M 10/54* (2013.01); *C01G 51/42* (2013.01); *H01M 4/525* (2013.01);
(Continued)

(58) Field of Classification Search
CPC ................. H01M 10/54; H01M 4/525; H01M 2004/028; C01G 51/42; C01P 2002/72; C01P 2006/40; Y02P 10/20; Y02W 30/84
See application file for complete search history.

(56) References Cited

U.S. PATENT DOCUMENTS

| | | | |
|---|---|---|---|
| 5,759,510 A * | 6/1998 | Pillai | C01G 45/02 423/599 |
| 8,616,475 B1 | 12/2013 | Smith et al. | |

(Continued)

FOREIGN PATENT DOCUMENTS

| | | |
|---|---|---|
| CN | 101336496 A | 12/2008 |
| CN | 103443996 A | 12/2013 |

(Continued)

OTHER PUBLICATIONS

Zhao et al. (2019) "Regeneration and reutilization of cathode materials from spent lithium-ion batteries", Chemical Engineering Journal, vol. 383, pp. 1-19.

(Continued)

*Primary Examiner* — Sarang Afzali
*Assistant Examiner* — Darrell C Ford
(74) *Attorney, Agent, or Firm* — Bryan Cave Leighton Paisner LLP

(57) ABSTRACT

There is provided a method for collecting and reusing an active material from positive electrode scrap. The positive electrode active material reuse method of the present disclosure includes (a) thermally treating positive electrode scrap comprising an active material layer on a current collector in air for thermal decomposition of a binder and a conductive material in the active material layer, to separate the current collector from the active material layer, and collecting an active material in the active material layer, (b) washing the collected active material using a lithium precursor aqueous solution which is basic in an aqueous solu- (Continued)

tion and drying, and (c) annealing the washed active material to obtain a reusable active material.

12 Claims, 7 Drawing Sheets

(51) Int. Cl.
*H01M 4/525* (2010.01)
*H01M 4/02* (2006.01)
(52) U.S. Cl.
CPC ...... *C01P 2002/72* (2013.01); *C01P 2004/03* (2013.01); *C01P 2006/40* (2013.01); *C01P 2006/80* (2013.01); *H01M 2004/028* (2013.01)

(56) References Cited

U.S. PATENT DOCUMENTS

| | | | |
|---|---|---|---|
| 10,333,183 B2* | 6/2019 | Sloop | H01M 4/5825 |
| 2003/0222020 A1 | 12/2003 | Lee et al. | |
| 2004/0028585 A1* | 2/2004 | Cardarelli | H01M 10/54 423/66 |
| 2009/0229413 A1 | 9/2009 | Kakuta et al. | |
| 2013/0266855 A1 | 10/2013 | Kim et al. | |
| 2013/0299735 A1* | 11/2013 | Chung | C01G 53/50 252/182.1 |
| 2014/0017621 A1 | 1/2014 | Iida et al. | |
| 2014/0306162 A1* | 10/2014 | Poe | H01M 4/587 252/506 |
| 2017/0062869 A1* | 3/2017 | Zhamu | H01M 4/131 |
| 2017/0200989 A1 | 7/2017 | Sloop | |
| 2017/0288215 A1* | 10/2017 | Mitsumoto | H01M 10/0525 |
| 2018/0013181 A1* | 1/2018 | Ho | H01M 6/52 |
| 2018/0166753 A1* | 6/2018 | Byun | H01M 10/54 |
| 2018/0170763 A1* | 6/2018 | Byun | H01M 10/4242 |
| 2018/0212282 A1 | 7/2018 | Lee et al. | |
| 2019/0152793 A1* | 5/2019 | Liu | H01M 10/54 |

FOREIGN PATENT DOCUMENTS

| | | |
|---|---|---|
| CN | 105895854 A | 8/2016 |
| JP | 4491085 B2 | 6/2010 |
| JP | 5245538 B2 | 7/2013 |
| JP | 2019-169308 A | 10/2019 |
| KR | 10-2003-0011737 A | 2/2003 |
| KR | 10-0448272 B1 | 9/2004 |
| KR | 10-0473641 B1 | 2/2005 |
| KR | 10-1328585 B1 | 11/2013 |
| KR | 10-2017-0075124 A | 7/2017 |
| KR | 10-2018-0087615 A | 8/2018 |
| KR | 10-2018-0100414 A | 9/2018 |

OTHER PUBLICATIONS

Shi et al. (2018) "Effective regeneration of LiCoO2 from spent lithium-ion batteries: a direct approach towards high-performance active particles", Green Chemistry, vol. 20, pp. 851-862.

Hanisch et al (2015) "Recycling of lithium-ion batteries: a novel method to separate coating and foil of electrodes", Journal of Cleaner Production, vol. 108, pp. 301-311.

* cited by examiner

METHOD FOR REUSING ACTIVE MATERIAL USING POSITIVE ELECTRODE SCRAP

CROSS-REFERENCE TO RELATED APPLICATIONS

The present application is a National Phase entry pursuant to 35 U.S.C. § 371 of International Application No. PCT/KR2020/015556, filed on Nov. 6, 2020, and claims the benefit of and priority to Korean Patent Application No. 10-2020-0062372, filed on May 25, 2020 with the Korean Intellectual Property Office, the disclosures of which are incorporated herein by reference in their entirety for all purposes as if fully set forth herein.

TECHNICAL FIELD

The present disclosure relates to a method for reusing resources in the fabrication of a lithium secondary battery. More particularly, the present disclosure relates to a method for collecting and reusing positive electrode scrap generated in the lithium secondary battery fabrication process or positive electrode active materials of lithium secondary batteries discarded after use.

BACKGROUND

Lithium secondary batteries that can be recharged repeatedly are gaining attention as an alternative to fossil energy. They have been primarily used in traditional handheld devices such as mobile phones, video cameras and electric power tools. Recently, the range of applications tends to gradually extend to vehicles which are powered by electricity (EVs, HEVs, PHEVs), large-capacity energy storage systems (ESSs) and uninterruptible power systems (UPSs).

A lithium secondary battery includes an electrode assembly including unit cells, each unit cell including a positive electrode plate and a negative electrode plate including a current collector and an active material coated on the current collector with a separator interposed between the positive electrode plate and the negative electrode plate, and a packaging or a battery case in which the electrode assembly is hermetically received together with an electrolyte solution. The lithium secondary battery primarily includes lithium-based oxide as the positive electrode active material and a carbon-based material as the negative electrode active material. The lithium-based oxide contains a metal such as cobalt, nickel or manganese. In particular, cobalt, nickel and manganese are very expensive invaluable metals. Among them, cobalt is a strategic metal, and its supply is the focus of attention all over the world. Due to the limited number of cobalt producing countries, the global supply of cobalt is unstable. When a supply and demand imbalance of strategic metal occurs, there is a very high possibility that the cost of the raw material will rise.

Studies have been made to collect and recycle invaluable metals from lithium secondary batteries (waste batteries) discarded after the expiration date. In addition to waste batteries, resources may be more preferably collected from waste materials discarded after punching the positive electrode plate or the positive electrode in which defects or failures occurred in the process.

Currently, the lithium secondary battery is fabricated, as shown in FIG. 1, by coating a positive electrode slurry including a positive electrode active material, a conductive material, a binder and a solvent on a long sheet-type positive electrode current collector 10 such as an aluminum (Al) foil to form a positive electrode active material layer 20, manufacturing a positive electrode sheet 30, and punching a positive electrode plate 40 to a predetermined size. The leftover after punching is discarded as positive electrode scrap 50. If the positive electrode active material is collected and reused from the positive electrode scrap 50, it will be very desirable in the industrial-economic and environmental aspects.

Most of the existing methods of collecting the positive electrode active material include dissolving the positive electrode with hydrochloric acid, sulfuric acid, nitric acid or the like, extracting the active material elements such as cobalt, nickel and manganese and using them as raw materials for the positive electrode active material synthesis. However, the active material element extraction using acids uses a non-eco-friendly process to collect pure raw materials, and needs a neutralization process and a waste water treatment process, resulting in the increased process cost. Additionally, it is impossible to collect lithium, one of the key positive electrode active material elements. To overcome these disadvantages, there is a need for a direct reuse method that does not dissolve the positive electrode active material and does not extract the active material in the form of an element.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

DISCLOSURE

Technical Problem

The present disclosure is directed to providing a method for collecting and reusing active materials from positive electrode scrap.

Technical Solution

To achieve the above-described problem, a method for reusing a positive electrode active material of the present disclosure includes (a) thermally treating positive electrode scrap comprising an active material layer on a current collector in air for thermal decomposition of a binder and a conductive material in the active material layer, to separate the current collector from the active material layer, and collecting an active material in the active material layer, (b) washing the active material collected from the step (a) using a lithium precursor aqueous solution which is basic in an aqueous solution and drying, and (c) annealing the washed active material to obtain a reusable active material.

The thermal treatment may be performed at 300 to 650° C. for 1 hour or less.

The thermal treatment may be performed at 550° C. for 30 min at a temperature rise rate of 5° C./min.

The washing may be performed by stirring the collected active material at the same time with impregnation of the lithium precursor aqueous solution.

The lithium precursor aqueous solution may contain a lithium precursor in an amount of more than 0% and 15% or less, and the lithium precursor preferably includes LiOH. The washing is preferably performed for 10 min or less.

The lithium precursor may be added at a ratio of lost lithium to a ratio between lithium and other metal in a raw active material used in the active material layer through the washing.

The annealing may be performed in air at 400 to 1000° C.

A temperature of the annealing step may exceed a melting point of the lithium precursor.

The active material collected from the above steps (a) may have a form of powder, and carbon produced by carbonization of the binder or the conductive material may not remain on a surface of the active material.

The reusable active material may have a similar particle size distribution to the active material in the active material layer.

A fluorine (F) content of the reusable active material may be 100 ppm or less.

The lithium precursor may be included in the lithium precursor aqueous solution in an amount of lithium depleted during the steps (a) and (b) above.

Another method for reusing a positive electrode active material according to the present disclosure includes (a) thermally treating positive electrode scrap comprising a lithium cobalt oxide positive electrode active material layer on a current collector in air at 300 to 650° C. for 1 hour or less, for thermal decomposition of a binder and a conductive material in the active material layer, to separate the current collector from the active material layer, and collecting an active material in the active material layer, (b) washing the collected active material for 10 min or less using a lithium precursor aqueous solution and drying, wherein the lithium compound solution is basic in an aqueous solution and contains a lithium precursor in an amount of more than 0% and 15% or less, and (c) annealing the washed active material in air at 400 to 1000° C. without adding an additional lithium precursor.

Advantageous Effects

According to the present disclosure, it is possible to reuse waste positive electrode active materials such as positive electrode scrap generated in the lithium secondary battery fabrication process without using acids, thereby achieving eco-friendliness. The method according to the present disclosure does not need a neutralization process or a waste water treatment process, thereby achieving environmental mitigation and process cost reduction.

According to the present disclosure, it is possible to collect all the metal elements of the positive electrode active materials. It is possible to collect the current collector since it does not dissolve the current collector. The extracted active material elements are not used as raw materials for positive electrode active material synthesis, and the active materials collected in the form of powder are directly reused, thereby achieving economical efficiency.

According to the present disclosure, since toxic and explosive solvents such as NMP, DMC, acetone and methanol are not used, thereby achieving safety, and since simple processes such as thermal treatment, washing and annealing are used, it is easy to manage the process and suitable for mass production.

In addition, according to the present disclosure, it is possible to prevent the production of LiF and $Co_3O_4$ by performing thermal treatment for a short time (1 hour or less), minimize the lithium dissolution caused by surface modification by shortening the surface modification time (10 min or less) in the washing process using the lithium precursor aqueous solution, and recover the battery characteristics of the recycled active material by recovering the crystal structure through the subsequent high temperature annealing.

BRIEF DESCRIPTION OF THE DRAWINGS

The accompanying drawings illustrate the embodiments of the present disclosure, and together with the following detailed description, serve to provide a further understanding of the technical aspects of the present disclosure, and thus the present disclosure should not be construed as being limited to the drawings.

DETAILED DESCRIPTION

Figure 1:
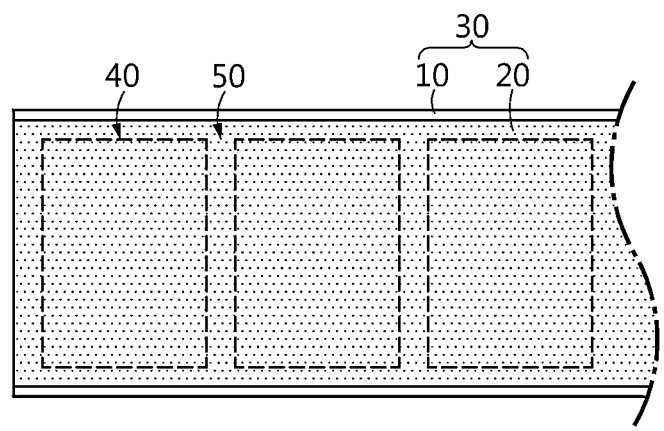
FIG. 1 is a diagram showing positive electrode scrap discarded after punching a positive electrode plate in a positive electrode sheet.

Hereinafter, the embodiments of the present disclosure will be described in detail with reference to the accompanying drawings. Prior to the description, it should be understood that the terms or words used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the embodiments described herein and illustrations shown in the drawings are just an example, and do not fully describe the technical aspect of the present disclosure, so it should be understood that a variety of other equivalents and modifications could have been made thereto at the time of filing the patent application.

In the following description, a reference is made to the accompanying drawings that make up some of the present disclosure. The embodiments described in the detailed description, the drawings and the appended claims are not intended to be limiting. Other embodiments may be used without departing from the technical aspect and scope of the subject matter disclosed herein, and modifications and changes may be made thereto. As commonly described herein and illustrated in the drawings, the aspects of the present disclosure may include arrangement, substitution, combination and design of a variety of different elements, and it will be immediately understood that all of them are clearly taken into account.

Unless otherwise defined, all terms (including technical and scientific terms) used herein have the same meaning as commonly understood by those having ordinary skill in the technical field pertaining to the present disclosure (hereinafter those skilled in the art).

The present disclosure is not limited to specific embodiments described herein. As obvious to those skilled in the art, many modifications and changes may be made thereto without departing from the technical aspects and scope of the present disclosure. In addition to those enumerated herein, functionally equivalent methods in the scope of the present disclosure will be obvious to those skilled in the art from the previous descriptions. Such modifications and changes fall in the scope of the appended claims. The present disclosure will be defined by the appended claims along with the scope of all equivalents to which the appended claims are entitled. It should be understood that the present disclosure is not limited to specific variant methods. It should be further understood that the terms used herein are for the purpose of describing the specific embodiments, but not intended to limit the present disclosure.

The conventional active material reuse process is mainly aimed at extracting the elements of invaluable metal (nickel, cobalt, manganese) in active materials of lithium secondary batteries of which the performance degraded after use and re-synthesizing the active materials, and as opposed to the conventional process, the present disclosure is characterized as collecting active materials from positive electrode scrap generated in the lithium secondary battery fabrication process.

In addition, the well-known active material reuse process involves producing metals (direct reduction method) or resynthesized active materials from invaluable metals extracted through acid/base dissolution or melting using reduction agents/additives, which requires an additional chemical method, making the process complex and causing additional economical expenses. However, the present disclosure relates to a method for reusing positive electrode active materials directly without dissolving the positive electrode active materials.

To directly reuse the positive electrode active materials, it is necessary to remove the current collector from the positive electrode. The current collector may be removed from the positive electrode by removing the binder through high temperature thermal treatment, melting the binder using the solvent, melting the current collector, and screening the active materials through dry milling and sieving.

When melting the binder using the solvent, the stability of the solvent is important. NMP is the most efficient solvent, but its disadvantage is toxicity and high cost. Another disadvantage is that a waste solvent re-treatment or solvent collection process is necessary. Melting the current collector requires a lower process cost than using the solvent. However, it is difficult to remove impurities from the reusable active material surface, and hydrogen gas is produced in the current collector removal process, causing an explosion risk. Dry milling and sieving cannot perfectly separate the current collector and the active material. The particle size distribution of the active materials changes in the milling process and it is difficult to remove the binder, resulting in characteristics degradation of batteries including the reusable active materials.

The present disclosure separates the active material and the current collector using high temperature thermal treatment. Particularly, thermal treatment is performed in air, so the process only requires heating without any special device configuration and thus is relatively simple, and it is suitable for mass production and commercialization. However, impurities should not remain on the reusable active material surface. The present disclosure suggests the step of removing impurities from the reusable active material surface.

Figure 2:
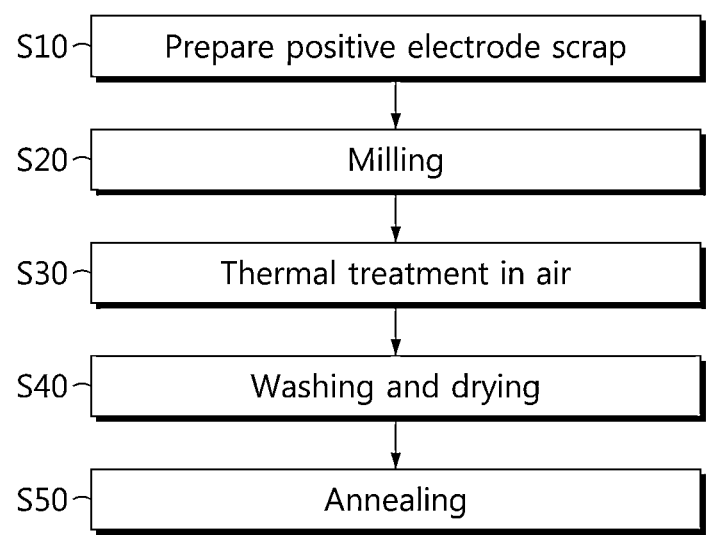
FIG. 2 is a flowchart of an active material reuse method according to the present disclosure.

Hereinafter, the active material reuse method according to an embodiment of the present disclosure will be described with reference to FIG. 2. FIG. 2 is a flowchart of the active material reuse method according to the present disclosure.

Referring to FIG. 2, first, waste positive electrode scrap is prepared (s10).

As described above with reference to FIG. 1, positive electrode scrap may be leftover after manufacturing a positive electrode sheet including a positive electrode active material layer on a current collector and punching the positive electrode sheet. In addition, positive electrode scrap may be prepared by collecting positive electrodes in which defects or failures occurred in the process. Additionally, positive electrode scrap may be prepared by separating positive electrodes from lithium secondary batteries discarded after use.

For example, the positive electrode scrap may be the leftover after coating a slurry prepared by mixing lithium cobalt oxide such as $LiCoO_2$(LCO) as an active material, carbon such as carbon black as a conductive material and polyvinylidene fluoride (PVdF) as a binder with N-methyl pyrrolidone (NMP) on a sheet type current collector of an aluminum foil, drying in a vacuum oven of about 120° C. to manufacture a positive electrode sheet, and punching the positive electrode plate into a predetermined size.

The positive electrode scrap has the active material layer on the current collector of a metal foil such as the aluminum foil. The active material layer is formed by coating the slurry including a mixture of the active material, the conductive material, the binder and the solvent, and after solvent volatilization, the active material and the conductive material are bonded by the binder. Accordingly, when the binder is removed, the active material may be separated from the current collector.

Subsequently, the positive electrode scrap is milled into a proper size (s20). The milling refers to cutting or shredding of the positive electrode scrap into a proper size for handling. After the milling, the positive electrode scrap is cut to, for example, 1 cm×1 cm. A variety of dry milling equipment including a hand-mill, a pin-mill, a disk-mill, a cutting-mill and a hammer-mill, and a high speed cutter may be used in the milling.

The milling may be performed considering the handling of the positive electrode scrap and the characteristics required in equipment used in the subsequent processes. For example, when equipment requiring continuous treatment is used to load and unload positive electrode scrap, it is necessary to mill too large positive electrode scrap to facilitate the movement of the positive electrode scrap.

Subsequently, the positive electrode scrap is thermally treated in air (s30).

In the present disclosure, thermal treatment is performed for thermal decomposition of the binder in the active material layer. The thermal treatment may be performed at 300 to 650° C., and may be referred to as high temperature thermal treatment. At the temperature of less than 300° C., it is difficult to remove the binder, failing to separate the current collector, and at the temperature of 650° C. or above, the current collector melts (Al melting point: 660° C.), failing to separate the current collector.

The thermal treatment time is long enough for thermal decomposition of the binder. For example, the thermal treatment time is about 30 min. Preferably, the thermal treatment time is 30 min or longer. As the thermal treatment time increases, the thermal decomposition of the binder is prolonged, but when the thermal treatment time is equal to or longer than a predetermined time, there is no difference in thermal decomposition effect. Preferably, the thermal treatment time is 30 min or longer and 5 hours or shorter. Most preferably, the thermal treatment time is 1 hour or less. The high temperature thermal treatment removes the binder and the conductive material to produce $CO_2$ and $H_2O$ which react with lithium on the positive electrode active material surface to produce $Li_2CO_3$, LiOH which, in turn, react with F present in the binder to produce LiF or metal fluoride. Additionally, in the case of LCO active material, $Co_3O_4$ may be produced on the surface by thermal decomposition. When a battery is manufactured, leaving $Co_3O_4$ on the surface, the battery characteristics may degrade. The thermal treatment time of 1 hour or less prevents the generation of impurities that cause loss of lithium such LiF and degrade the performance of the secondary battery when left. Particularly, short thermal treatment of 1 hour or less prevents the production of $Co_3O_4$.

The thermal treatment equipment may include various types of furnaces. For example, the thermal treatment equipment may be a box type furnace, and when considering productivity, may be a rotary kiln capable of continuous treatment.

The thermal treatment may be followed by fast or slow cooling in air.

For example, the thermal treatment may be performed at 600° C. for 30 min at the temperature rise rate of 5° C./min. For example, the temperature rise rate is within the allowable range of the box type furnace and is enough to heat the positive electrode scrap without thermal shock. 600° C. is set taking into account the melting point of the Al current collector and for good thermal decomposition of the binder. When the thermal treatment is performed at the above-described temperature for less than 10 min, thermal decomposition is insufficient, and thus it is necessary to perform the thermal treatment for 10 min or longer, and preferably for 30 min or longer. At this temperature, the thermal treatment for 30 min induces sufficient thermal decomposition of the binder and the conductive material, and prevents the production of LiF and $Co_3O_4$.

$CO_2$ and $H_2O$ are removed by the thermal decomposition of the binder and the conductive material in the active material layer through thermal treatment in air. Since the binder is removed, the active material may be separated from the current collector and the active material to collect may be screened in the form of powder. Accordingly, the current collector may be separated from the active material layer and the active material in the active material layer may be collected by s30.

It is important to perform the thermal treatment of s30 in air. When the thermal treatment is performed in a reducing or inert gas atmosphere, the binder and the conductive material suffer carbonization rather than thermal decomposition. When carbonized, carbon remains on the active material surface and degrades the performance of the reusable active materials. When the thermal treatment is performed in air, carbon in the binder or the conductive material is removed by combustion reaction with oxygen to produce CO, $CO_2$ gas, and thus the binder and the conductive material do not remain and are almost removed.

Accordingly, according to the present disclosure, the active material is collected in the form of powder, and carbon produced by the carbonization of the binder or the conductive material may not remain on the surface.

Subsequently, the collected active material is washed and dried (s40). It is important to wash using a lithium precursor aqueous solution which is basic in an aqueous solution. The lithium precursor aqueous solution contains a lithium precursor, preferably LiOH, in an amount of more than 0% and 15% or less. It is preferred to use 15% or less of LiOH.

When LiOH is included in an excessive amount, excess LiOH may remain on the active material surface after washing, which may affect the subsequent annealing process. It is undesirable to add excess LiOH to make the active material surface before the annealing as clean as possible, and the amount of LiOH is limited to 15% or less.

The washing may be performed by immersing the collected active material in the lithium precursor aqueous solution. The washing includes immersing the active material in the lithium precursor aqueous solution which is basic in an aqueous solution, and stirring in the immersed state. It is desirable to perform immersion and stirring together. When the active material is immersed in the lithium precursor aqueous solution without stirring, the washing process is slow, resulting in lithium dissolution. When stirring is performed together, the process time is minimized, and accordingly it is desirable to perform the stirring at the same time with the lithium precursor aqueous solution impregnation.

The longer washing may reduce the capacity due to excessive lithium dissolution. Accordingly, it is preferred to wash for 1 hour or less. It is most preferred to wash for a very short time of 10 min or less to minimize the lithium dissolution.

The drying may be performed in an oven (convection type) in air after filtration. The washing using the lithium precursor aqueous solution which is basic in an aqueous solution is performed for removal of LiF and metal fluoride that may be present on the surface of the collected active material and surface modification. During the thermal treatment of s30, the binder and the conductive material in the active material layer are removed by evaporation of $CO_2$ and $H_2O$, and in this process, $CO_2$ and $H_2O$ react with lithium on the active material surface to produce $Li_2CO_3$, LiOH, and F present in the binder such as PVdF reacts with the metal element of the positive electrode active material to produce LiF or metal fluoride. When LiF or metal fluoride remains, the characteristics of the battery including the reusable active materials degrade. The present disclosure adds the washing step of s40, to remove reaction products that may be generated on the reusable active material surface in the thermal treatment step (s30), in order to prevent impurities from remaining on the reusable active material surface.

In s40, it is important to wash with the lithium precursor aqueous solution which is basic in an aqueous solution. When a sulfuric acid or hydrochloric acid aqueous solution is used instead of the lithium precursor aqueous solution which is basic in an aqueous solution, F on the active material surface is washed out, but the performance of the reusable positive electrode active materials may degrade due to the dissolution of transition metal (Co, Mg) present in the active material. Preferably, the lithium precursor aqueous solution which is basic in an aqueous solution used in the present disclosure plays a role in removing trace amounts of binder that may be left after the thermal decomposition of s30, does not dissolve the transition metal present in the active material, and compensate for the amount of lithium dissolved in the washing process.

Particularly, it is preferable to add lithium at a ratio of lost lithium to a ratio between lithium and other metal in the raw active material used in the active material layer through the washing of s40. To this end, it is important to maintain the concentration of the lithium precursor aqueous solution and the washing time as mentioned previously.

It is possible to reduce the lithium loss in the active material through the thermal treatment time of 1 hour or less in the previous step s30, but additional losses of lithium in a small amount may occur during washing, and when lithium losses occur in the thermal treatment or washing process, the lithium precursor aqueous solution used in the washing process of s40 compensates for the lost lithium.

Subsequently, annealing is performed without adding a lithium precursor to the washed active material (s50). s50 yields reusable active materials.

It is possible to prevent the lithium loss in the active material through the thermal treatment of 1 hour or less and washing for 10 min or less in the previous steps s30, s40. Accordingly, it is possible to omit the addition of an additional lithium precursor for compensating the lithium loss. Since the previous washing step (s40) compensates for lithium using the lithium precursor aqueous solution, there is no need to add an additional lithium precursor.

s50 recovers the crystal structure of the active material through annealing so that the characteristics of the reusable active material may be recovered or improved to the fresh active material level.

The active material surface structure may be modified on through the previous steps s30, s40. Besides, in the case of LCO active material, $Co_3O_4$ may be produced on the surface by thermal decomposition. When a battery is manufactured, leaving $Co_3O_4$ on the surface, the battery characteristics may degrade. The present disclosure may recover the crystal structure and remove $Co_3O_4$ through s50 so that the initial characteristics may be recovered or improved to the similar level to fresh active materials.

The annealing may be performed in air at 400 to 1000° C. The annealing temperature may be 600 to 900° C. The temperature changes within the limited range depending on the type of the lithium precursor. The annealing time may be at least 1 hour. Preferably, the annealing time is about 5 hours. When the annealing time is long, the crystal structure may be sufficiently recovered, but the prolonged annealing does not greatly affect the performance. The annealing time is, for example, about 15 hours or less. The annealing equipment may be similar or identical to that of the thermal treatment step s30.

For example, when LiOH is used as the lithium precursor in s40, the annealing temperature of s50 is preferably 400 to 600° C., and more preferably, 450 to 480° C. It is because the melting point of LiOH is 462° C.

Preferably, the annealing temperature is higher than the melting point of the lithium precursor. However, at the temperature higher than 1000° C., the thermal decomposition of the positive electrode active material occurs and degrades the performance of the active material, and accordingly the annealing temperature does not exceed 1000° C.

According to the present disclosure, LiF or metal fluoride is removed in the washing step of s40, and $Co_3O_4$ is removed in the annealing step of s50. The step of washing using the lithium precursor aqueous solution which is basic in an aqueous solution and drying is safe and low-priced, and may remove LiF or metal fluoride without losses of other elements, prevent the dissolution of transition metal, and compensate for the lithium loss occurring in the process. The annealing step is also safe and low-priced and may effectively remove $Co_3O_4$ and recover the crystal structure, i.e., improve the crystallinity, thereby enhancing the battery characteristics of the reusable active material.

Through s40, the present disclosure may adjust the LiF content on the collected active material surface to less than 500 ppm, thereby improving the capacity. Preferably, the F content may be 100 ppm or less. More preferably, the F content may be 30 ppm or less.

The reusable active material obtained according to the present disclosure may have a similar particle size distribution to the active material present in the active material layer within positive electrode scrap, requiring no separate treatment. Since carbon produced by carbonization of the binder or the conductive material does not remain on the surface, there is no need for a carbon removal step. Accordingly, the active material obtained through the method of FIG. 2 may be used to manufacture the positive electrode without any treatment.

The reusable active material may be used 100% without composition adjustment, or may be mixed with fresh LCO, and may be used to prepare a slurry in combination with a conductive material, a binder and a solvent. According to the present disclosure, it is possible to recover the battery characteristics of the recycled active material by recovering the crystal structure through annealing. In addition, it is possible to reduce the process cost by reusing the positive electrode active material in the waste positive electrode scrap generated in the secondary battery fabrication step.

Hereinafter, the experimental example of the present disclosure will be described in detail.

Experimental Example

Positive electrode active materials are prepared by the method of the following example and comparative examples to evaluate the electrochemical performance.

Example: Reusable active materials are collected according to the active material reuse method of the present disclosure as described above. The positive electrode scrap discarded after punching the positive electrode plate is prepared and the thermal treatment of s30 is performed at 600° C. for 30 min. The washing of s40 is performed for 10 min using LiOH. In s50, annealing is performed in air at 750° C. for 15 hours without adding an additional lithium precursor.

Comparative example 1: Fresh LCO is used, not reusable active material.

Comparative example 2: The removal of the binder and the conductive material, the separation of the Al current collector and the collection of the LCO active material are carried out by performing only the thermal treatment of s30 in the active material reuse method of the present disclosure as described above. s30 is performed in the same condition as the example. In the active material reuse method of the present disclosure, the surface modification of s40 and the crystal structure recovery of s50 are not performed.

Comparative example 3: The method of comparative example 2 repeats, but the thermal treatment time in the thermal treatment step s30 is 5 hours.

Comparative example 4: Further to comparative example 2, LCO active material is collected by performing the surface modification of s40 in the active material reuse method of the present disclosure as described above. That is, the surface modification is performed but the crystal structure recovery of s50 in the active material reuse method of the present disclosure is not performed. s40 is performed in the same condition as the example.

96 wt % of the positive electrode active material collected or prepared in example and comparative examples, 2 wt % of carbon black as a conductive material and 2 wt % of PVdF as a binder are metered and mixed with NMP to prepare a slurry, a positive electrode is made, a cell (Coin Half Cell, CHC) is manufactured and the electrochemical performance is evaluated.

To find the amount of remaining LiF in the collected active material of example and comparative example 2, F is detected and analyzed by ICP. The result is shown in the following Table 1.

TABLE 1

|  | Comparative example 2 | Example |
|---|---|---|
| F content (mg/kg) | 1900 | ND |

ND indicates the F content of 30 ppm or less as measured. Referring to the above Table 1, it can be seen that the F content in the collected positive electrode active material in example is much lower than that of comparative example 2. That is, it can be seen that LiF is completely dissolved in the lithium compound solution by washing and removed so completely that it is impossible to detect by ICP. Accordingly, it can be seen that the removal of LiF by s40 is very good.

ICP analysis is conducted on the positive electrode active material collected or prepared in each of example and comparative examples, to analyze an amount of a particular element. The result is shown in the following Table 2.

TABLE 2

|  | Al content (wt %) |
|---|---|
| Comparative example 1 | 0.33 |
| Comparative example 2 | 0.33 |
| Comparative example 4 | 0.33 |
| Example | 0.33 |

The fresh active material used in the experiment further includes Al as seen in comparative example 1. It can be seen that comparative example 2 undergoes thermal treatment, but the Al content does not change, and also in comparative example 4 and example further comprising the subsequent process steps, the Al content is maintained. According to the present disclosure, it can be seen that it is possible to remove LiF or metal fluoride without losses of other element such as Al and prevent the dissolution of transition metal.

Figure 3:
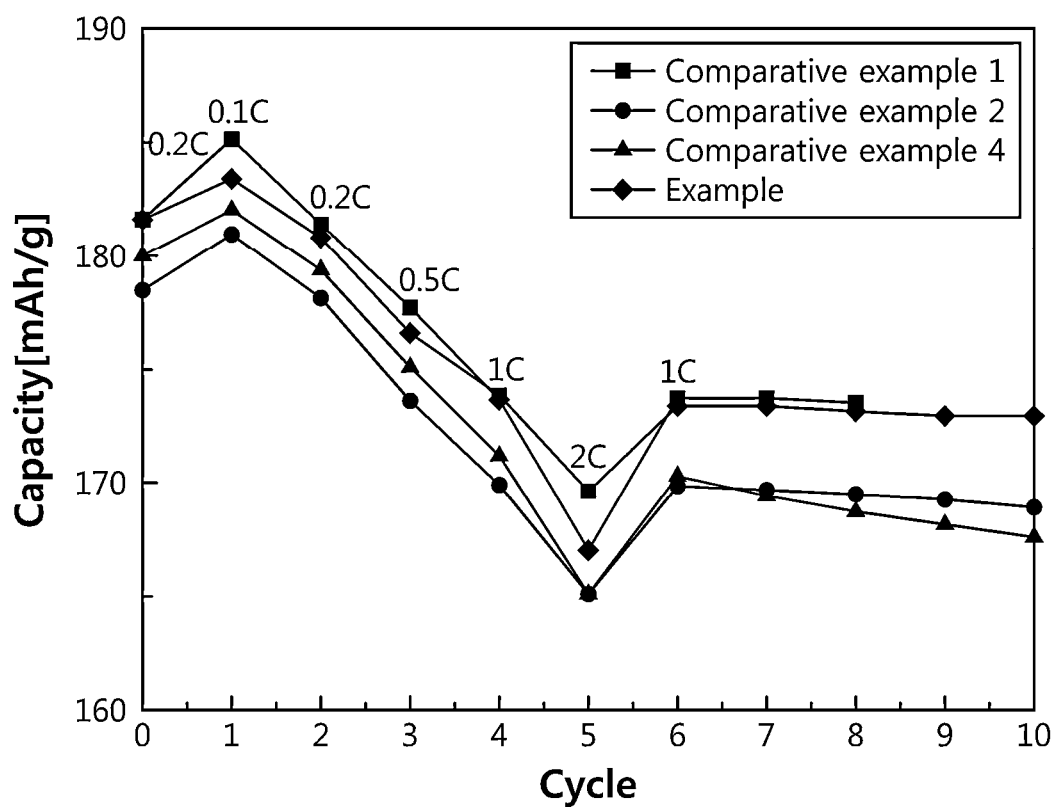
FIG. 3 shows the result of cell evaluation using active materials of example and comparative examples.

FIG. 3 shows the result of cell evaluation using the active materials of example and comparative examples. At different currents, capacity as a function of cycle number is evaluated to determine the rate performance. The equipment used for evaluation is a charge/discharge tester commonly used in the lab. There is no difference depending on the measuring device or method. In the graph of FIG. 3, the horizontal axis is the number of cycles and the vertical axis is capacity.

Voltage is 3 to 4.5V, and initial formation charge/discharge is performed at 0.2 C/0.2 C. The electrolyte solution for the cell is a carbonate based electrolyte solution and includes Ethylene carbonate (EC):Ethyl methyl carbonate (EMC)=3:7 with an addition of additives.

Referring to FIG. 3, the lowest rate performance is found in comparative example 2 including the reusable active material without surface modification and crystal structure recovery according to the present disclosure. It is because the binder and the conductive material are removed in the high temperature thermal treatment process of s30 to produce $CO_2$ and $H_2O$, which react with lithium on the positive electrode active material surface to produce $Li_2CO_3$ and LiOH, which, in turn, react with F present in the binder to produce LiF or metal fluoride on the reusable active material surface. Additionally, the low battery characteristics are presumably attributed to the presence of $Co_3O_4$ on the LCO surface due to the thermal decomposition.

Compared to comparative example 2, comparative example 4 performs surface modification. It is evaluated that comparative example 4 has better results than comparative example 2 since reaction products on the surface are removed through washing.

Compared to comparative example 4, example performs annealing. It is found that modification structure on the active material surface during recycling and reduction of $Co_3O_4$ to LCO crystal structure lead to better results than the initial characteristics of the fresh active material of comparative example 1. According to the present disclosure, it is possible to collect the active material from the positive electrode scrap on the directly usable level. It is safe since toxic and explosive solvents such as NMP, DMC, acetone and methanol are not used, and since simple and safe methods such as thermal treatment, washing and drying, and annealing are used, it is suitable for mass production.

Figure 4:
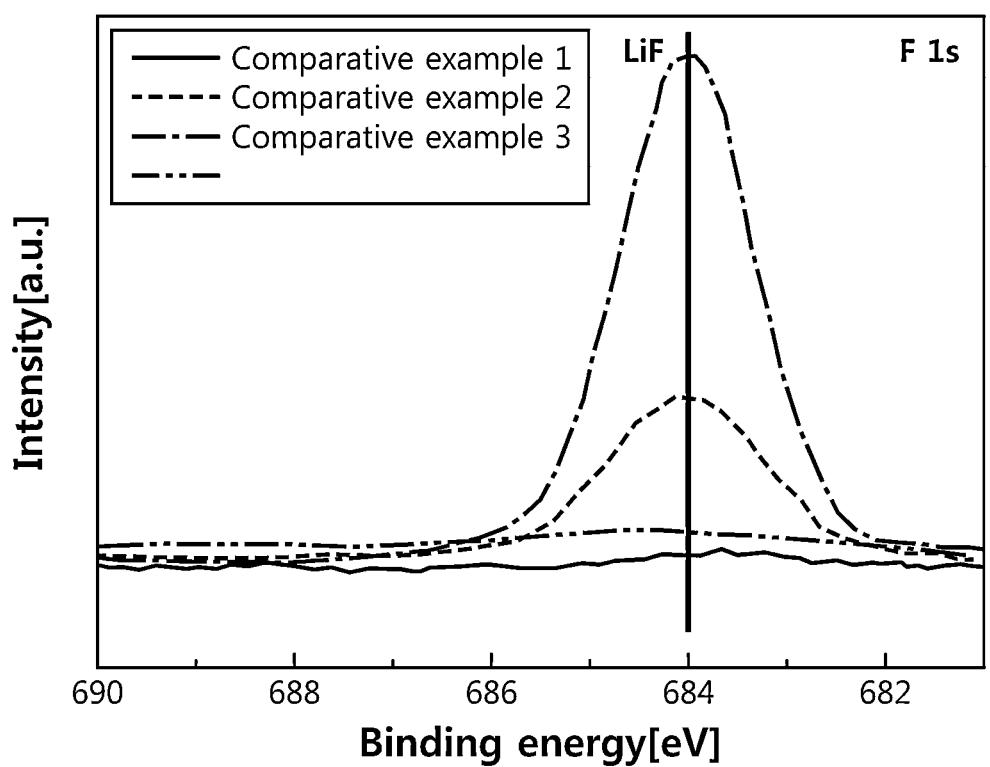
FIG. 4 shows X-Ray Photoelectron Spectroscopy (XPS) patterns of active materials of example and comparative examples.

FIG. 4 shows XPS patterns of the active materials of example and comparative examples. In the XPS pattern, the horizontal axis indicates Binding energy (unit: eV). The XPS pattern may be acquired using an XPS measuring instrument commonly used in the lab. For example, analysis may be conducted using K-Alpha available from Thermo Fisher Scientific. F present in the binder reacts with Li of the active material in the thermal treatment process to produce LiF. In FIG. 4, the peak around 684 eV is attributed to LiF, and for each sample, higher intensity represents a larger amount of LiF present on the positive electrode active material surface. Since the XPS pattern of comparative example 1 is measured using fresh LCO, the presence of LiF is not measured. However, comparative example 2 exhibits the presence of LiF produced on the active material surface in the thermal treatment process. In comparative example 3, since the thermal treatment time was increased to 5 hours, compared to comparative example 2, the consequential F production increases and the amount of LiF produced on the active material surface increases, and thus the LiF peak intensity of XPS is measured higher than comparative example 2. Since the amount of LiF present on the active material surface is the cause of battery characteristics degradation, it is necessary to remove LiF. As opposed to comparative example 2, example removes LiF through washing, and the XPS results reveal that there is no peak of LiF.

Figure 5:
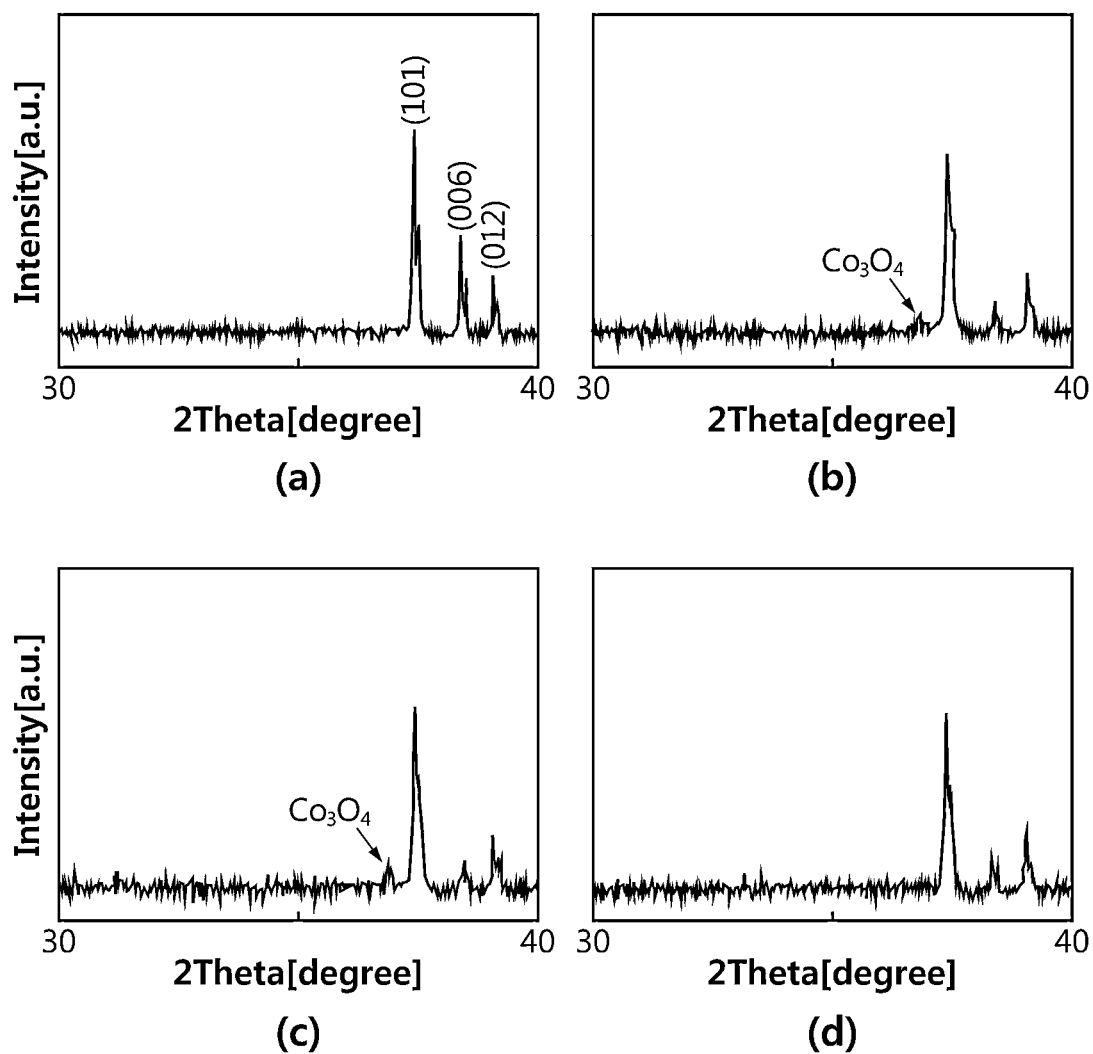
FIG. 5 shows X-Ray Diffraction (XRD) patterns of active materials of example and comparative examples.

FIG. 5 shows XRD patterns of the active materials of example and comparative examples. In the XRD patterns, the horizontal axis is 2θ(Theta) (degree, °), and the vertical axis is intensity. The XRD patterns may be acquired using an X-ray diffractometer commonly used in the lab. For example, analysis may be conducted using Rigaku X-ray diffractometer XG-2100. However, there is no difference depending on the device or method.

FIG. 5(a) shows the XRD pattern of comparative example 1, i.e., fresh LCO. FIG. 5(b) shows the XRD pattern of the active material of comparative example 2, and FIG. 5(c) shows the XRD pattern of the active material of comparative example 3. FIG. 5(d) shows the XRD pattern of the active material of example. When comparing (b) and (c) with (a), $Co_3O_4$ phase generated during the thermal treatment process is observed. $Co_3O_4$ is generated on the active material surface, i.e., on the LCO surface in the thermal treatment process. Thus, it can be seen that $Co_3O_4$ is produced on the surface of LCO in the thermal treatment process of s30.

FIG. 5(d) shows the XRD pattern of the active material of example. When comparing (b) and (c) with (d), removal of $Co_3O_4$ phase is verified. It is because in the annealing process of s50, LiOH remaining on the active material surface in the washing process of s40 reacts with $Co_3O_4$ to produce LCO and $Co_3O_4$ is removed.

Through the XPS and XRD pattern analysis, it can be seen that the results of example are similar to the results of comparative example 1. Accordingly, recovery of example of the present disclosure to the level of the fresh active material of comparative example 1 is verified. According to the present disclosure, it is possible to collect the active material from the positive electrode scrap on the directly reusable level.

Figure 6:
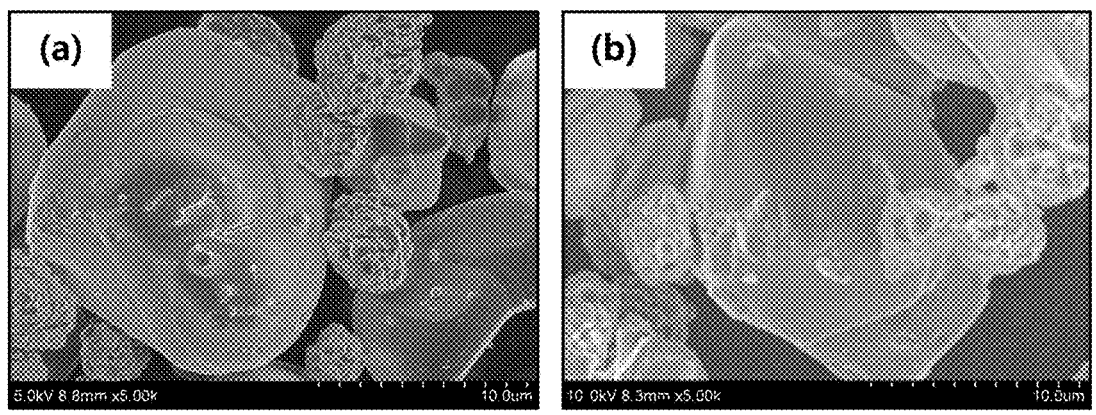
FIG. 6 is a Scanning Electron Microscope (SEM) photographic image of active materials of example and comparative examples.

FIG. 6 is a Scanning Electron Microscope (SEM) photographic image of the active materials of example and comparative examples. The SEM photographic image is captured using SEM equipment commonly used in the lab. For example, imaging may be performed using HITACHI s-4200. However, there is no difference depending on the measuring device or method.

FIG. 6(a) is the SEM photographic image of fresh LCO of comparative example 1, and FIG. 6(b) is the SEM photographic image of the reusable active material of example. It can be seen that when comparing with fresh LCO, the collected LCO of example shows the same shape. Besides, only LCO is observed, revealing that the binder and the conductive material were removed in the high temperature thermal treatment process. Accordingly, it can be seen that the active material is separated from the current collector and the binder or the conductive material scarcely remains on the active material surface by thermal treatment in air. According to the present disclosure, it is possible to separate the current collector and the active material without using a complex method or a harmful material, thereby collecting the active material in an eco-friendly manner. Since acids are not used, a neutralization process or a waste water treatment process is unnecessary, thereby achieving environmental mitigation and process cost reduction.

Figure 7:
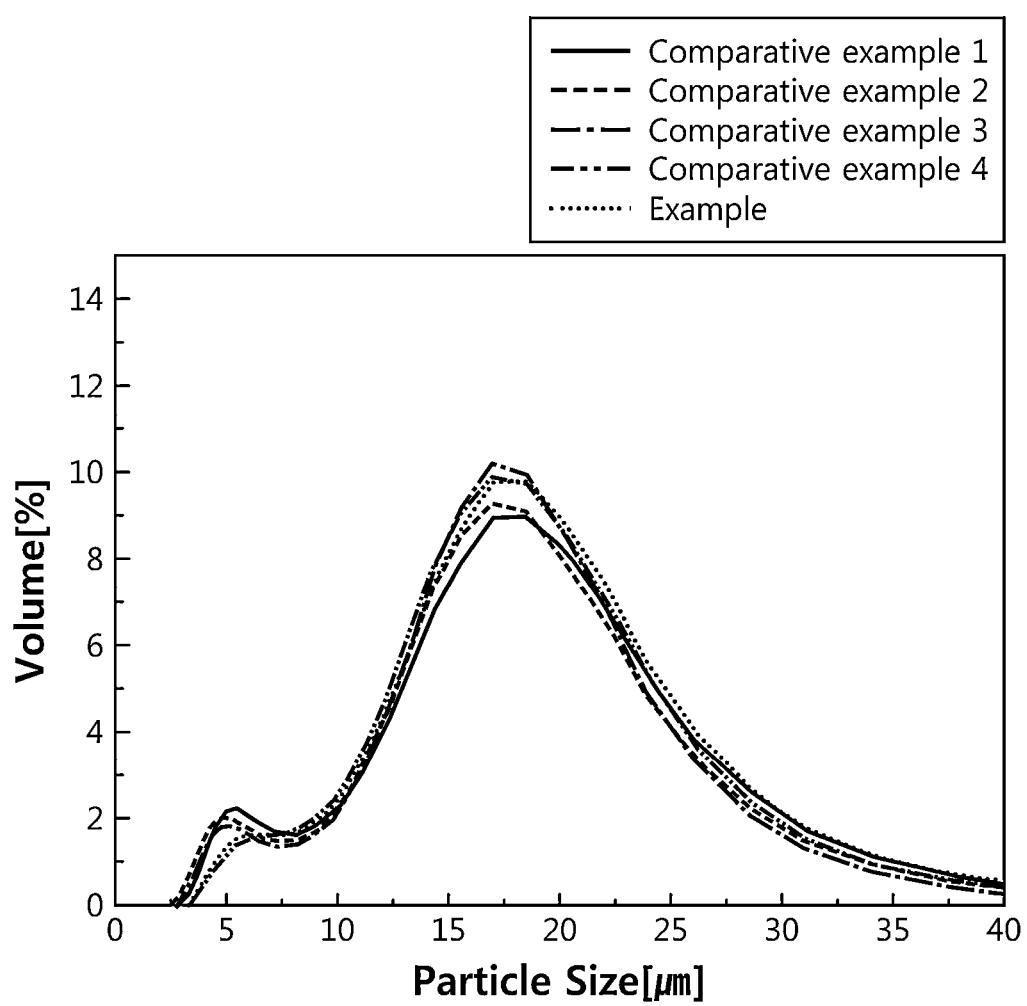
FIG. 7 is a particle size distribution graph of active materials of example and comparative examples.

FIG. 7 is a particle size distribution graph of the active materials of example and comparative examples. The particle size distribution may be acquired using a particle size analyzer commonly used in the lab. For example, measurements may be performed using Horiba LA 950V2 particle size analyzer. However, there is no difference depending on the measuring device or method. In FIG. 6, the horizontal axis is particle size (um) and the vertical axis is volume (%).

All the active materials collected in example and comparative examples 2, 3 and 4 have similar particle size distributions compared to fresh LCO of comparative example 1. The particle size distribution is defined as similar when the volume % of particles having the same particle size has a difference within the range of +/-2%. According to the present disclosure, since the particle size distribution of the active material does not change and initial characteristics are almost maintained, it is expected that the characteristics of batteries including the reusable active materials will be on a similar level to the characteristics of batteries using fresh active materials.

According to the present disclosure, it is possible to reuse positive electrode scrap using a simple, eco-friendly and economical method, and a lithium secondary battery manufactured reusing the prepared LCO positive electrode active material does not have a problem with the battery performance.

While the present disclosure has been hereinabove described with regard to a limited number of embodiments and drawings, the present disclosure is not limited thereto and it is obvious to those skilled in the art that a variety of modifications and changes may be made thereto within the technical aspects of the present disclosure and the scope of the appended claims and their equivalents.

What is claimed is:

1. A method for producing a reusable positive electrode active material, comprising:
  (a) thermally treating positive electrode scrap comprising an active material layer on a current collector in air for thermal decomposition of a binder and a conductive material in the active material layer, to separate the current collector from the active material layer, and collecting an active material in the active material layer;
  (b) washing the active material collected from the step (a) for 1 hour or less using a lithium precursor aqueous solution which is basic in an aqueous solution and drying; and
  (c) annealing the washed active material without adding an additional lithium precursor to obtain a reusable active material,
  wherein the thermal treatment is performed at 300 to 650° C. for 1 hour or less.

2. The method according to claim 1, wherein the lithium precursor aqueous solution contains a lithium precursor in an amount of greater than 0% and equal to or less than 15%, and the washing is performed for 10 minutes or less.

3. The method according to claim 2, wherein the lithium precursor includes LiOH.

4. The method according to claim 1, wherein the washing is performed by stirring the collected active material at the same time with impregnation of the lithium precursor aqueous solution.

5. The method according to claim 1, wherein, through the washing step (b), a lithium precursor included in the lithium precursor aqueous solution is added to the active material collected from the step (a) to compensate for an amount of lithium dissolved from the active material during the washing step (b).

6. The method according to claim 1, wherein the annealing is performed in air at 400 to 1000° C.

7. The method according to claim 1, wherein the lithium precursor aqueous solution contains a lithium precursor, and a temperature of the annealing step exceeds a melting point of the lithium precursor.

8. The method according to claim 1, wherein the active material collected from the step (a) has a form of powder, and carbon produced by carbonization of the binder or the conductive material does not remain on a surface of the active material.

9. The method according to claim 1, wherein the reusable active material has a similar particle size distribution to the active material in the active material layer.

10. The method according to claim 1, wherein a fluorine (F) content of the reusable active material is 100 ppm or less.

11. The method according to claim 1, wherein a lithium precursor is included in the lithium precursor aqueous solution in an amount of lithium depleted during the steps (a) and (b).

12. A method for reusing a positive electrode active material, comprising:
  (a) thermally treating positive electrode scrap comprising a lithium cobalt oxide positive electrode active material layer on a current collector in air at 300 to 650° C. for 1 hour or less for thermal decomposition of a binder and a conductive material in the active material layer, to separate the current collector from the active material layer, and collecting an active material in the active material layer;
(b) washing the active material collected from the step (a) for 10 min or less using a lithium precursor aqueous solution and drying, wherein the lithium precursor aqueous solution is basic in an aqueous solution and contains a lithium precursor in an amount of more than 0% and 15% or less; and
(c) annealing the washed active material in air at 400 to 1000° C. without adding an additional lithium precursor to obtain a reusable active material.

\* \* \* \* \*